United States Patent
Sato

(10) Patent No.: US 6,356,713 B1
(45) Date of Patent: Mar. 12, 2002

(54) BLURRING CORRECTION APPARATUS AND IMAGE TAKING APPARATUS HAVING THE SAME

(75) Inventor: Tatsuya Sato, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/611,467

(22) Filed: Jul. 7, 2000

(30) Foreign Application Priority Data

Jul. 12, 1999 (JP) ........................................... 11-197551
Jul. 12, 1999 (JP) ........................................... 11-197552

(51) Int. Cl.[7] .......................... G03B 17/00; G03B 17/38
(52) U.S. Cl. ............................. 396/56; 396/59; 396/502
(58) Field of Search ............................. 396/52, 55, 94, 396/95; 348/208; 359/554, 557

(56) References Cited

U.S. PATENT DOCUMENTS 5,873,004 A * 2/1999 Shiomi ......................... 396/52

FOREIGN PATENT DOCUMENTS

JP            6-148730    *  5/1994

* cited by examiner

Primary Examiner—David M. Gray
Assistant Examiner—Rochelle Blackman
(74) Attorney, Agent, or Firm—Frishauf, Holtz, Goodman, Langer & Chick, P.C.

(57) ABSTRACT

A blurring correction controlling section determines a correction direction (deflection direction) from the blurring detected by a blurring detecting/calculating section and corrects the blurring by varying a refractive index of the electric deflection member in accordance with this correction direction. At this time, the electric deflection member is controlled such that, based on a result of detection by a refractive index state detecting section, the refractive index of the electric deflection member becomes a state corresponding to the correction direction. When it is detected based on a result of detection by the refractive index state detecting section that the electric deflection member is set in a correction direction, that is, becomes a desired refractive index state, the blurring correction controlling section informs this state to an image taking apparatus controlling section and the image taking apparatus controlling section allows an exposure device to start an exposure operation (image taking operation).

18 Claims, 11 Drawing Sheets

BLURRING CORRECTION APPARATUS AND IMAGE TAKING APPARATUS HAVING THE SAME

CROSS-REFERENCE TO RELATED APPLICATIONS

This application is based upon and claims the benefit of priority from the prior Japanese Patent Applications No. 11-197551, filed Jul. 12, 1999; and No. 11-197552, filed Jul. 12, 1999, the entire contents of which are incorporated herein by reference.

BACKGROUND OF THE INVENTION

The present invention relates to a blurring correction apparatus for correcting an adverse influence from "blurring" produced at an image taking apparatus and to an image taking apparatus having such a blurring correction apparatus.

Conventionally, an apparatus for preventing a lowering in quality of an image resulting from "hand blurring" produced at a time of taking an image or picture has been variously proposed.

As one example, JPN PAT APPLN KOKAI PUBLICATION No. 6-148730 discloses a camera's hand blurring correction apparatus for effecting "blurring" correction by varying a refractive index of a prism comprised of an optical anistropic medium and, by doing so, deflecting that light beam.

In the blurring correction apparatus disclosed in the above-mentioned Publication, use is made of, as a correction optical member, a prism (electric deflection member) formed of an optical anisotropic medium and, since it is possible to decrease the number of mechanical movable parts for blurring correction, this can contribute to reducing a size of an apparatus obtained.

In the blurring correction apparatus disclosed in the above-mentioned Publication, no consideration is paid to a detecting device for detecting a state of an electric deflection member. That is, the refractive index varies by voltage control and, since this state variation is not a mechanical one, it is not possible to detect it. The user cannot know whether or not a desired blurring correction operation is ensured and feels somewhat uneasy about the blurring correction operation.

Further, in order to obtain the refractive index corresponding to a blurring amount, a table for supply voltage against the blurring amount is utilized. It is preferable that this table be properly updated so as to be made properly responsive to the "aging" and temperature variation. Since, however, it is not possible to detect the above-mentioned refractive index state, the updating of the table cannot be done.

For the blurring correction apparatus disclosed in the above-mentioned Publication it is difficult to maintain the blurring correction performance stable.

The prism formed of the above-mentioned optical anisotropic medium ensures no adequate responsiveness when the refractive index is varied and it may be considered that, in some cases, an irregular action such as the "hand blurring" cannot be properly handled. In particular, in the case of a lower temperature involved and in the event of the "aging", it may be predicted that their responsiveness is further lowered, thus presenting a somewhat greater problem.

BRIEF SUMMARY OF THE INVENTION

The present invention has been achieved with the above in view and the object of the present invention is to provide a blurring correction apparatus for performing blurring correction by varying the refractive index of a member, under the control of a supply voltage, comprised of an optical anisotropic medium which can maintain a blurring correction performance stable by a simpler method.

The present invention also provides an image taking apparatus having a blurring correction apparatus which can maintain a blurring correction performance stable by a simpler method.

According to a first aspect of the present invention, there is provided a blurring correction apparatus mounted on an image taking apparatus, comprising:

blurring detecting means for detecting a blurring state of the image taking apparatus;

refractive index variable electric deflection means arranged in an image taking optical system of the image taking apparatus and used for correcting an adverse effect resulting from the blurring of the image taking apparatus;

controlling means for controlling the electric deflection means in accordance with an output of the blurring detecting means; and refractive index state detecting means for detecting a refractive index state of the electric deflection means, wherein the controlling means performs operation control of the electric deflection means on the basis of a result of detection by the refractive index state detecting means.

According to a second aspect of the present invention, there is provided a blurring correction apparatus mounted on an image taking apparatus, comprising:

blurring detecting means for detecting a blurring state of the image taking apparatus;

refractive index variable electric deflection means arranged in an image taking optical system of the image taking apparatus and used for correcting an adverse effect resulting from the blurring of the image taking apparatus;

voltage generating means for generating a voltage for setting a refractive index of the electric deflection means;

refractive index state detecting means for detecting a refractive index state of the electric deflection means; and voltage controlling means for controlling a voltage generated at the voltage generating means on the basis of outputs of blurring detecting means and refractive index state detecting means.

According to a third aspect of the present invention, there is provided a blurring correction apparatus mounted on an image taking apparatus, comprising:

first and second electric deflection means arranged in an image taking optical system of the image taking apparatus to allow image taking light to be deflected in first and second directions in accordance with a supply voltage, the deflection directions of the first and second electric deflection means being arranged orthogonal to an image taking optical axis on an image-taking image formation surface;

first and second blurring detection means for detecting blurring in first and second directions of the image taking apparatus;

blurring calculating means for calculating first and second blurring amounts in the first and second directions from outputs of the first and second blurring detecting means;

determining means for determining deflection directions of the first and second electric deflection means on the basis of first and second blurring amounts calculated by the blurring calculating means;

voltage setting means for finding first and second voltage values supplied to the first and second electric deflection means in accordance with the deflection directions of the first and second electric deflection means determined by the determining means;

voltage generating means for supplying first and second voltages to the first and second electric deflection means in accordance with the first and second voltages found by the voltage setting means; and control means for controlling the above-mentioned respective means to perform a blurring correction operation, here, the blurring correction operation being terminated before an image taking operation by the image taking apparatus.

According to a fourth aspect of the present invention, there is provided a blurring correction apparatus mounted on an image taking apparatus, comprising:

first and second electric deflection members arranged in an image taking optical system of the image taking apparatus to allow refractive index to vary in accordance with a supply voltage, here, the first and second electric deflection members being such that deflection directions are arranged orthogonal to an image taking optical axis on a shot image formation surface;

first and second blurring detecting sensors for detecting blurring in first and second directions of the image taking apparatus;

first and second blurring calculating sections for calculating first and second blurring amounts in the first and second directions from the outputs of the first and second blurring detecting sensors;

first and second direction determining sections for determining deflection directions of the first and second electric deflection members on the basis of first and second blurring amounts calculated by the blurring calculating sections;

first and second correction controlling sections for finding first and second voltage values supplied to the first and second electric deflection members in accordance with the deflection directions of the first and second electric deflection members output from the first and second direction determining sections;

first and second voltage generating sections for supplying voltages corresponding to the first and second voltage values found by the first and second correction controlling sections; and a CPU for performing a blurring correction operation before the image taking operation by the image taking apparatus and inhibiting the blurring correction operation during the performing of an image taking operation by the image taking apparatus.

According to a fifth aspect of the present invention, there is provided an image taking apparatus comprising:

an operation means for outputting a designation signal for designating the performance of an image taking operation in accordance with a manual operation;

image taking means having an image taking optical system;

image taking control means for controlling the image taking means in accordance with a designating signal outputted from the operation means and performing an image taking operation;

detecting means for detecting a blurring state of the image taking apparatus;

blurring correction means arranged in the image taking optical system; and blurring correction controlling means for controlling the blurring correction means in accordance with an output of the detecting means and thereby correcting an adverse effect resulting from the blurring of the image taking apparatus, wherein the blurring correction controlling means operates the blurring correction means in a predetermined direction in accordance with the designating signal and the image taking controlling means performs the image taking operation after the blurring correcting means reaches a predetermined state.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The embodiments of the present invention will be explained below with reference to the accompanying drawing.

FIRST EMBODIMENT

Figure 1:
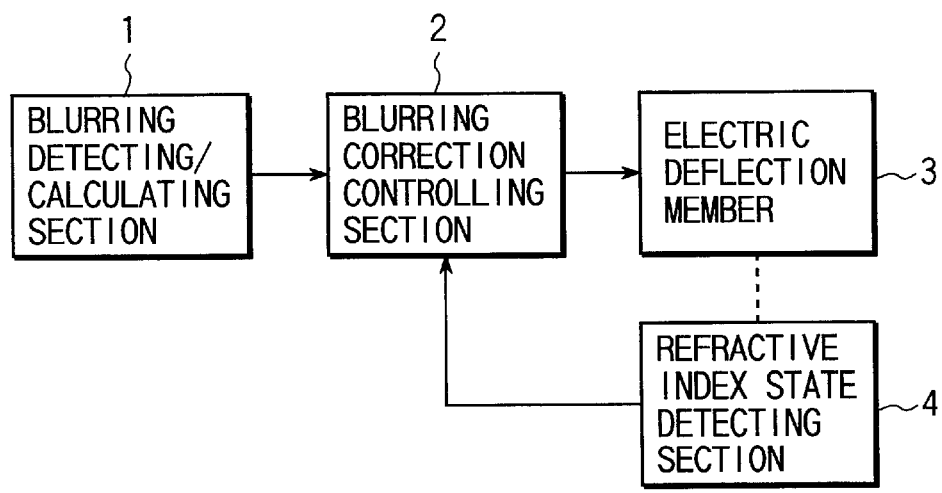
FIG. 1 is a block diagram showing a blurring correction apparatus according to a first embodiment of the present invention.

A blurring correction apparatus according to a first embodiment of the present invention is applied to an image taking apparatus, such as a camera, and, as shown in FIG. 1, comprises a blurring detecting/calculating section 1, a blurring correction controlling section 2, an electric deflection member 3 and a refractive index state detecting section 4.

Here, the blurring detecting/calculating section 1 comprises a blurring sensor known as a vibration gyro and adapted to detect a mechanical vibration and a signal processing section for processing an output signal of the blurring sensor. As the blurring sensor use can be made of an angular velocity sensor as disclosed in JPN PAT APPLN KOKAI PUBLICATION No. 6-148730.

The blurring correction controlling section 2 performs control under which the electric deflection member 3 is moved based on the "blurring" detected at the blurring detecting/calculating section 1 and it determines the blurring correction direction (deflection direction) of the electric deflection member 3. In the present invention, the term "correction direction" (deflection direction) is not used to simply mean simple upward and downward and left and right directions but used also to contain a meaning including a correction amount corresponding to "any specific direction at any specific angle".

The electric deflection member 3 is comprised of a member for varying the refractive index under operation control of the blurring correction controlling section 2.

The refractive index state detecting section 4 is adapted to detect at what refractive index the electric deflection member 3 is and a result of its detection is sent to the blurring correction controlling section 2.

In the blurring correction apparatus thus arranged, the blurring correction controlling section 2 determines a correction amount and direction from the "blurring" detected at the blurring detecting/calculating section 1 and, by varying the refractive index of the electric deflection member 3 in accordance therewith, corrects the blurring. At this time, the electric deflection member 3 is so controlled that, based on the result of the detection by the detecting section 4, the refractive index of the electric deflection member 3 is set in a state corresponding to the above-mentioned correction direction.

In this way, the blurring correction apparatus according to a first embodiment detects the refractive index state (deflection state) of the electric deflection member 3 and effects such control as to set the refractive index in a desired state. By doing so, it is possible to maintain the blurring correction performance stable.

Figure 2:
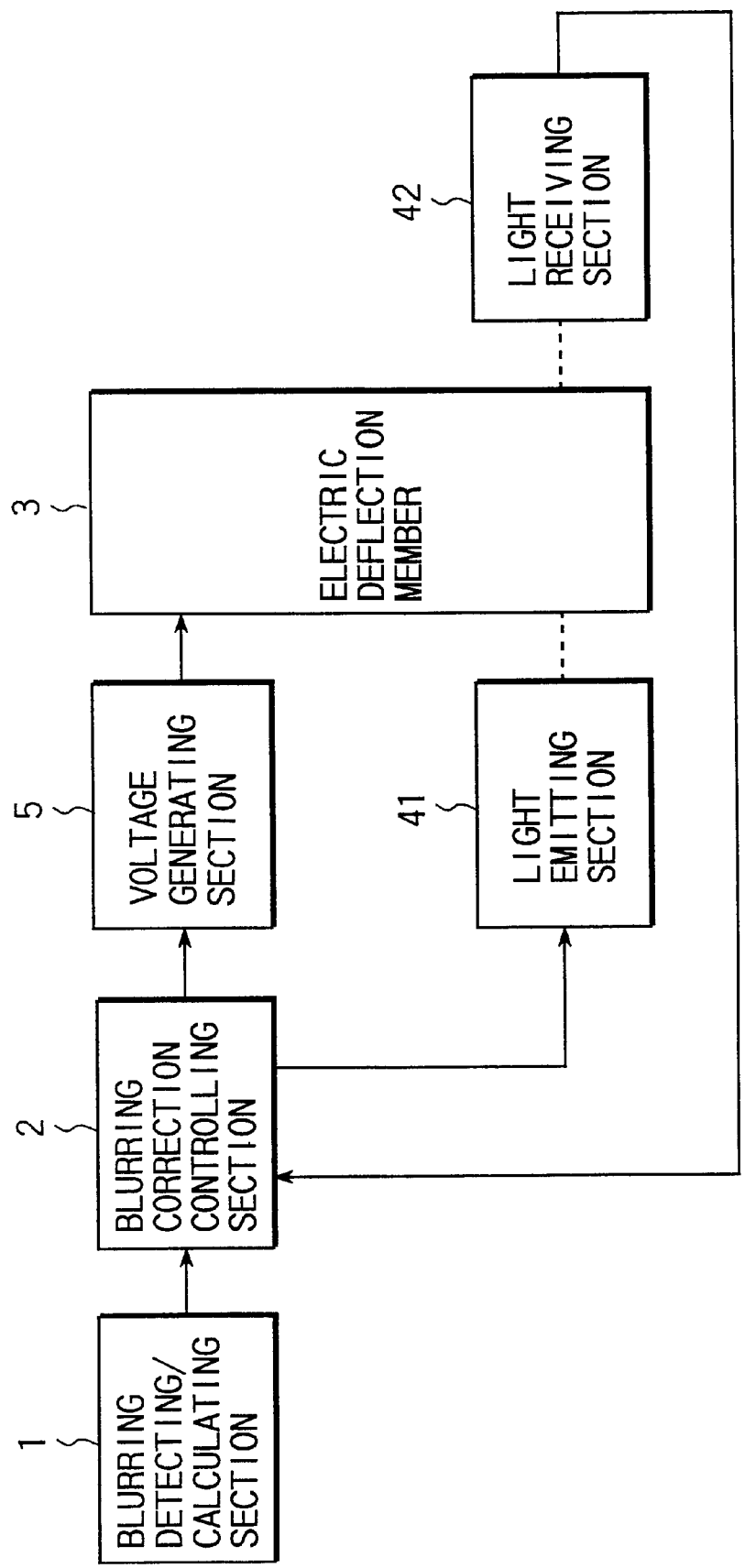
FIG. 2 is a block diagram showing another arrangement of a blurring correction apparatus according to the first embodiment.

In the case where, as the electric deflection member 3, use is made of a prism comprised of an optical anisotropic medium as disclosed in JPN PAT APPLN KOKAI PUBLICATION No. 6-148730, the blurring correction apparatus according to the first embodiment will be as shown in FIG. 2.

That is, a voltage generating section 5 is arranged between the blurring correction controlling section 2 and the electric deflection member 3 and, as the refractive index state detecting section 4, use is made of a light emitting section 41 and light receiving section 42.

In this case, the voltage generating section 5 generates a voltage corresponding to a blurring correction direction determined by the blurring correction controlling section 2 and supplies it to the electric deflection member 3. The electric deflection member 3 has its refractive index varied in accordance with the supplied voltage.

As the light emitting section 41 use can be made of a light emitting diode (LED), infrared light emitting diode (IRED), etc. As a light receiving section use can be made of a photodiode (PD), position sensing device (PSD), etc. The light emitting section 41 and light receiving section 42 are so arranged as to allow the emitting of the light by the light emitting section 41 and receiving of the emitted light by the receiving section 42 to be done at those areas not conductive to an image formation of the electric deflection member 3.

Figure 3:
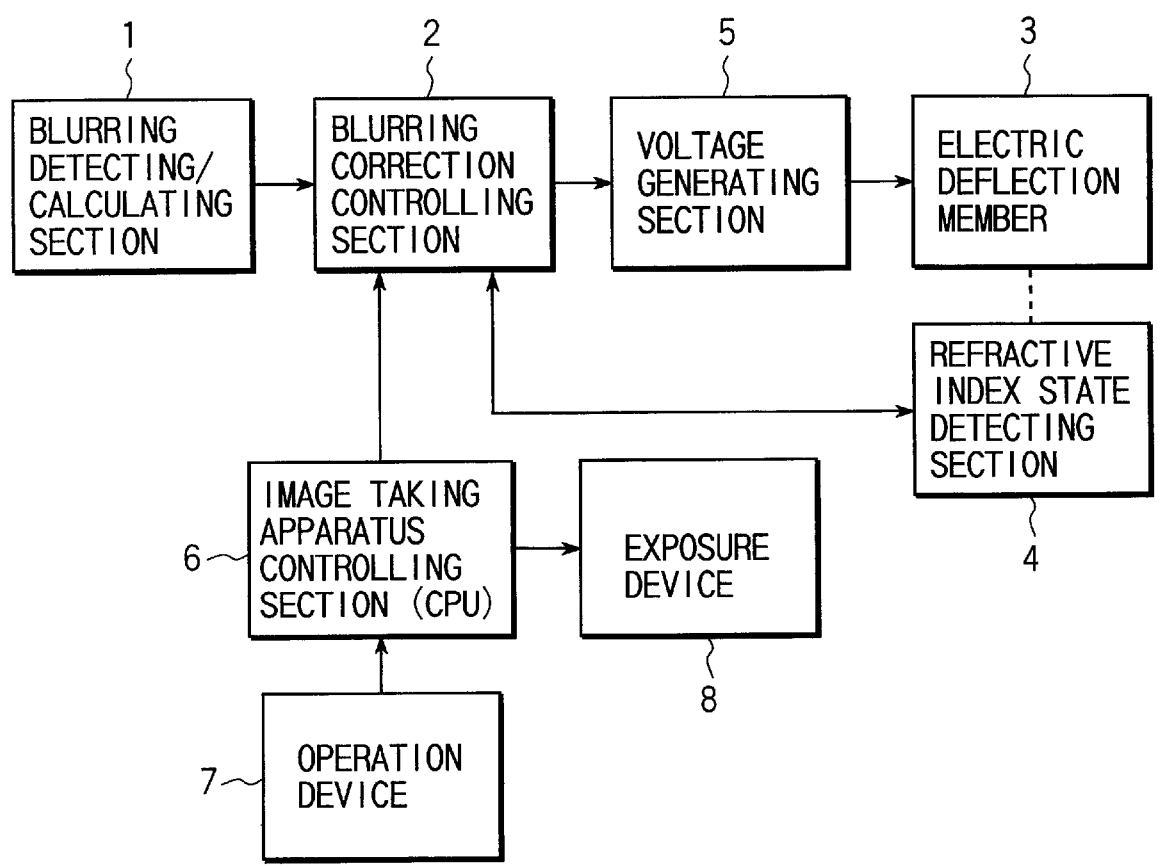
FIG. 3 is a block diagram of an image taking apparatus applied to the blurring correction apparatus according to the first embodiment.

FIG. 3 is a block diagram of an image taking apparatus applied to the blurring correction apparatus according to the first embodiment.

That is, the image taking apparatus includes, in addition to the blurring correction apparatus, an image taking apparatus controlling section 6, operation device 7 and exposure device 8. Here, the image taking apparatus control section 6 is comprised of a CPU for controlling the image taking apparatus as a whole. The operation device 7 is comprised of an operation member, such as a release button. And the exposure device 8 includes a mirror and shutter and constitutes a section where an image is actually taken onto a film.

Figure 4:
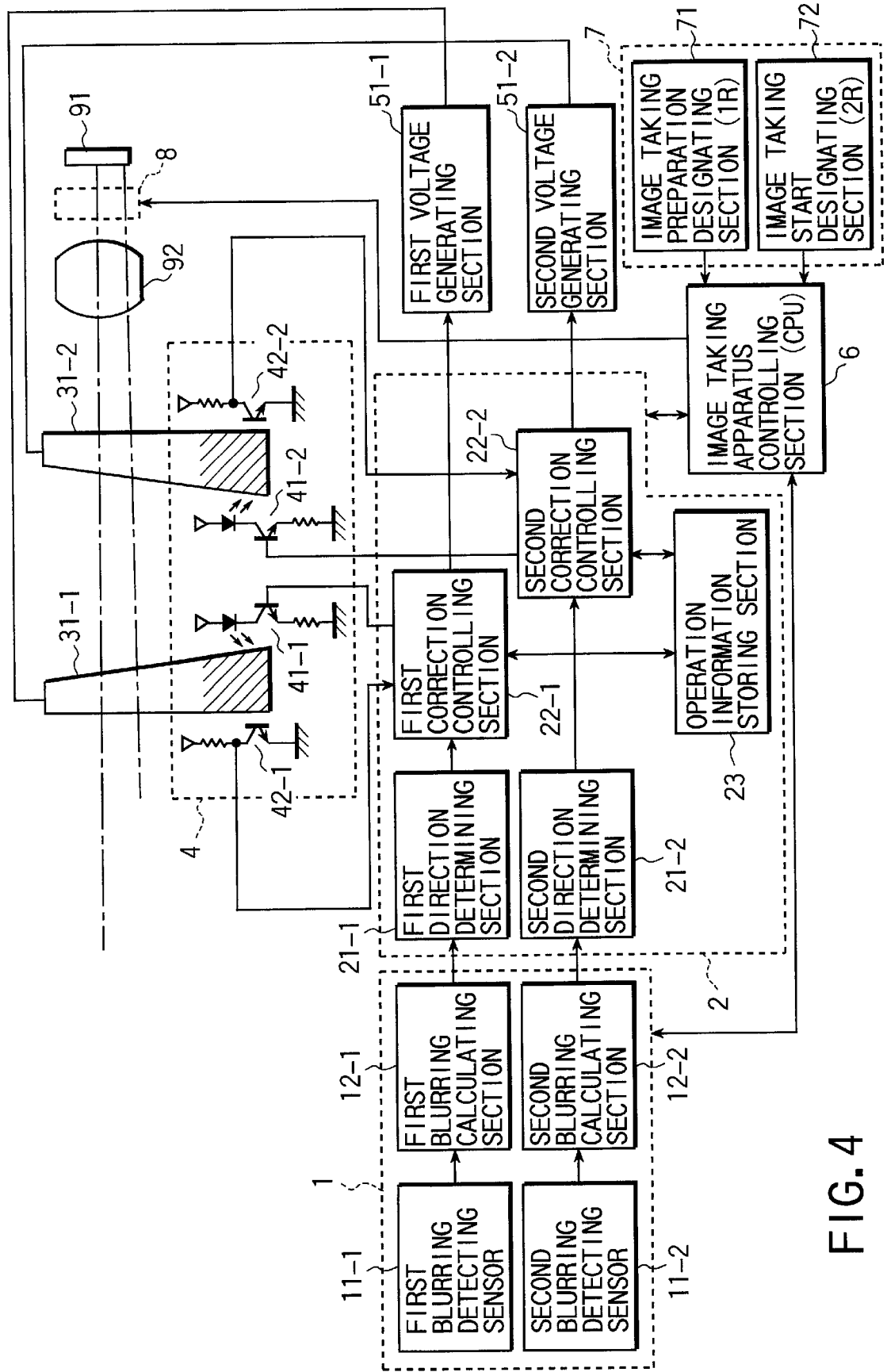
FIG. 4 is a detailed arrangement of the image taking apparatus applied to the blurring correction apparatus according to the first embodiment.

FIG. 4 is a view showing a detailed arrangement of the image taking apparatus applied to the blurring correction apparatus according to the first embodiment.

In the present embodiment, the blurring detecting/calculating section 1 comprises first and second blurring detecting sensors 11-1 and 11-2 and first and second blurring calculating sections 12-1 and 12-2. A blurring correction controlling section 2 comprises first and second direction determining sections 21-1 and 21-2, first and second correction controlling sections 22-1 and 22-2 and operation information memory section 23. The voltage generating section 5 comprises first and second voltage generating sections 51-1 and 51-2 and the electric deflection member 3 comprises first and second electric deflection members 31-1 and 31-2. And the light emitting section 41 comprises first and second light emitting sections 41-1 and 41-22 and the light receiving section 42 comprises first and second light receiving sections 42-1 and 42-2. Here, these terms "first and second" correspond to the vertical and lateral directions of an image formation surface of a film.

The image taking apparatus includes the image taking apparatus controlling section (CPU) 6 for controlling the whole image taking apparatus and blurring correction device, an operation device 7 comprising an image taking preparation designating section 71 as a first release (1R) and an image taking start designating section 72 as a second release (2R), and the exposure device 8 arranged between an image formation surface 91 and an image taking lens 92.

Here, the first blurring detecting sensor 11-1 detects first direction blurring and the second blurring detecting sensor 11-2 detects second direction blurring. The first blurring calculating section 12-1 calculates an amount of blurring relating to the first direction from a detection output of the first blurring detecting sensor 11-1 and the second blurring calculating section 12-2 calculates an amount of blurring relating to the second direction from a detection output of the second blurring detecting sensor 11-2.

The first direction determining section 21-1 determines a correction direction relating to the first direction on the basis of the first direction calculated at the first blurring calculating section 12-1 and the second direction determining section 21-2 determines a correction direction relating to the second direction on the basis of a amount of blurring relating to the second direction calculated by the second blurring calculating section 12-2. Here, the operation information storing section 23 is comprised of a nonvolatile memory, such as an EEPROM, which stores a table showing a relation between supply voltages to the first and second electric deflection members 31-1 and 31-2 and refractive indexes varying in accordance with the supply voltages.

Based on the correction direction relating to the first direction determined by the first correction determining section 21-1, the fist correction controlling section 22-1 finds, while referring to the table data of the operation information storing section 23, a voltage for being changed to a refractive index to which the first electric deflection member 31-1 is set in its correction direction (deflection direction) and causes a voltage corresponding to its voltage value to be generated in the first voltage generating section 51-1. Based on the correction direction relating to the second direction determined by the second direction determining section 21-2, the second correction control section 22-2, likewise, finds, while referring to the table data of the operation information storing section 23, a voltage for being changed to a refractive index to which the second electric deflection member 31-2 is set in its correction direction (deflection direction) and causes a voltage corresponding to its voltage value to be generated in the second voltage generating section 51-2.

The first and second electric deflection member 31-1 and 31-2, being supplied with the voltages generated in the first and second voltage generating sections 51-1 and 51-2, are comprised of liquid crystal prisms as disclosed, for example, in JPN PAT APPLN KOKAI PUBLICATION No. 6-148730. Though being described in a symmetrical relation in FIG. 4, in actuality, these prisms are so arranged as to have their deflection directions set orthogonal to each other.

The first and second light emitting sections 41-1 and 41-2 include corresponding LED's and the first and second light receiving sections 42-1 and 42-2 include corresponding PDS. That is, the light is emitted from the LED and, past the corresponding electric deflection member, is received by the PD. By the light receiving amounts of the PD's, the first- and second correction controlling sections 22-1 and 22-2 can know the refractive indexes of the corresponding electric deflection members. In order for the light from the light emitting sections 41-1 and 41-2 to prevent leaking onto an image formation surface and imparting an adverse effect on the taking of an image, the electric deflection members 31-1 and 31-2, each, extend beyond an optical path of the image taking lens 92 and enable state detection to be made in a "beyond the optical path" position as indicated by the hatched area in FIG. 4.

Now an explanation will be given below of such an arrangement as set out above.

Figure 5:
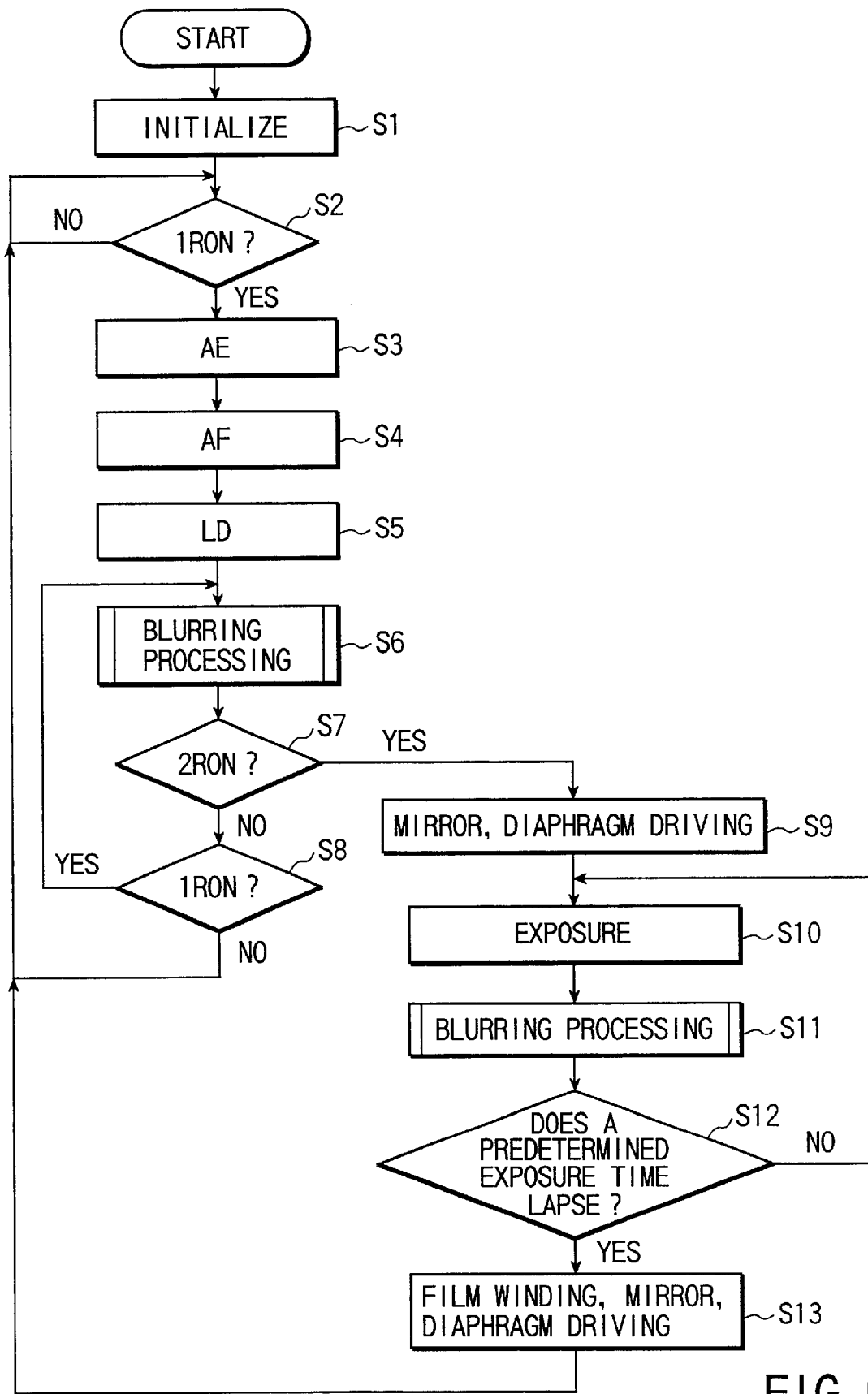
FIG. 5 is a flow chart for explaining the operation of the image taking apparatus of FIG. 4.

FIG. 5 is a flow chart on the operation of the image taking apparatus applied to the blurring correction apparatus having such an arrangement.

That is, the image taking apparatus controlling section 6 initializes associated parts of the image taking apparatus and blurring correction apparatus (step S1). Then a wait is made for the image taking preparation designating section (1R) 71 to be turned ON (step S2). Various kinds of operations of the image taking apparatus, such as the mode setting, etc., though being sequentially involved, are omitted because these are not directly relevant to the present invention.

When the image taking preparation designating section (1R) 71 is turned ON, an AE operation (step S3), AF operation (step S4) and LD operation (step S5) are done using a light measuring section, range-finding section, motor, not shown.

And, here, blurring processing including the blurring correction and table updating is performed (step S6) as will be described in more detail below.

Thereafter, it is decided whether or not the image taking start designating section (2R) 72 is turned ON (step S7). If not ON, it is decided whether or not the image taking preparation designating section (1R) 71 still stays ON (step S8). Here, if the image taking preparation designating section (1R) 71 still stays ON, control goes back to step S6. If no longer ON, control goes back to step S2.

If, on the other hand, the image taking start designating section (2R) 72 is turned ON, the image taking apparatus controlling section 6 starts driving the mirror, diaphragm, etc., of the exposure device 8 (Step S9). And if the driving of the mirror, diaphragm, etc., is ended, then the operation of the exposure device 8 is started and an exposure operation is carried out (step S10).

Then, here, the same blurring processing as that at step S6 is again performed (step S11).

After this blurring process is terminated, it is decided whether or not a predetermined exposure time lapses (step S12). If not yet, control goes back to step S10. If the predetermined exposure time lapses, the mirror and diaphragm of the exposure device 8 are driven to the initial state (step S13) and control goes back to step S2.

Figures 6, 11:
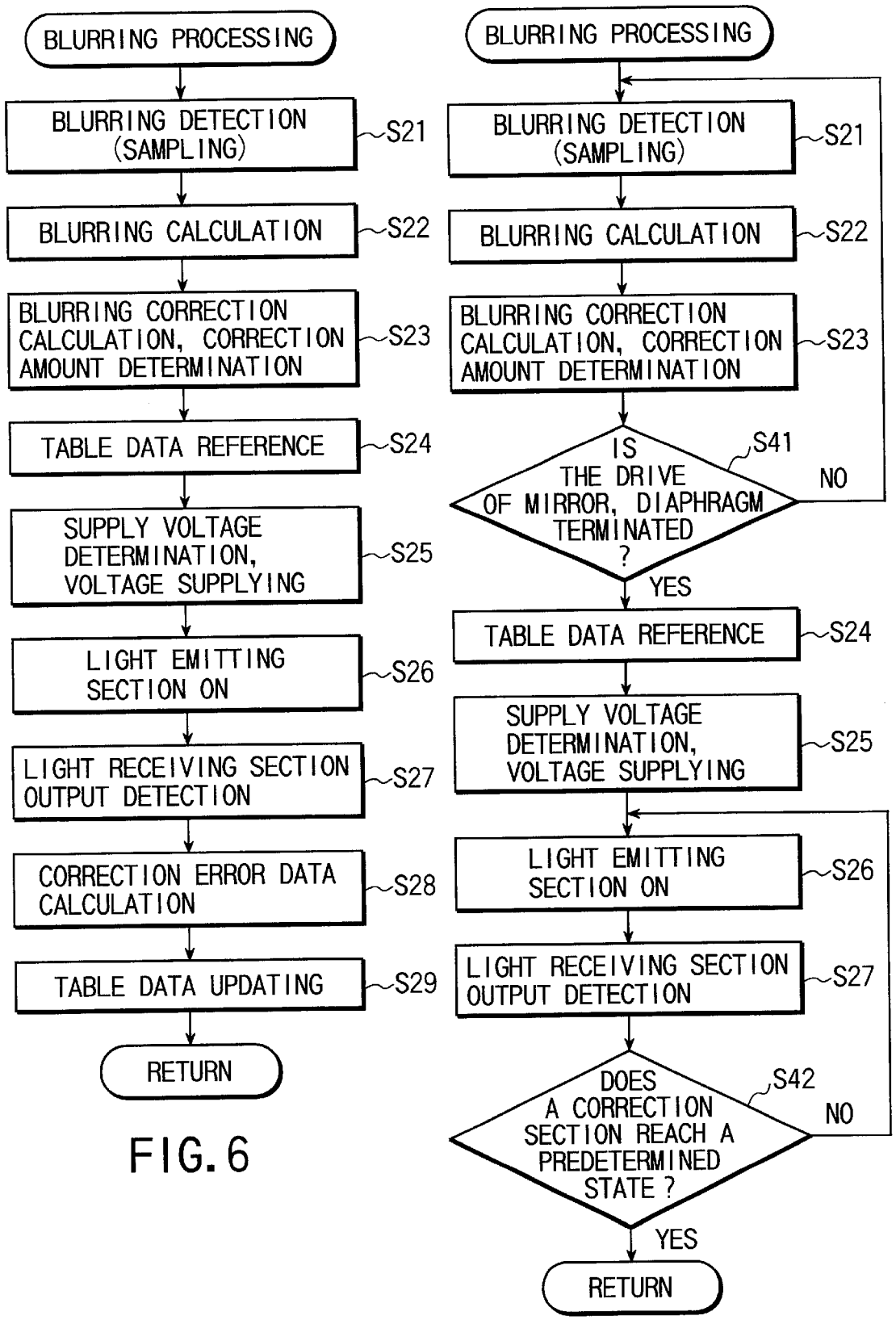
FIG. 6 is an operation flow chart of blurring processing in FIG. 5.
FIG. 11 is an operation flow chart of the blurring processing in FIG. 10.

The blurring processing called at steps S6 and S11 is performed as shown in FIG. 6.

That is, first, blurring detection is performed at the first and second blurring detecting sensors 11-1 and 11-2 in the blurring detecting/calculating section 1 (step S21) and the blurring calculation is performed at the first and second blurring calculating sections 12-1 and 12-2 (step S22). And the first and second direction determining section 21-1 and 21-2 of the blurring correction controlling section 2 determine the correction direction relating to the first and second directions (step S23). Then the first and second correction controlling sections 22-1 and 22-2 in the blurring correcting section 2 refer to table data stored in the operation information storing section 23 (step S24), find voltage values corresponding to the correction directions determined by the first and second direction determining sections 21-1 and 21-2 and cause voltages corresponding to these voltage values to be generated in the first and second voltage generating sections 51-1 and 51-2 to allow the voltages to be supplied to the first and second electric deflection members 31-1 and 31-2 (step S25).

Here, the first and second correction controlling sections 22-1 and 22-2 turn the first and second light emitting sections 41-1 and 41-2 ON (step S26) and detect the outputs of the first and second light receiving sections 42-1 and 42-2 (step S27). And based on the output of the detected light receiving sections 42-1 and 42-2 the first and second correction controlling sections 22-1 and 22-2 decide those refractive index states of the first and second electric deflection members 31-1 and 31-2, calculate correction error data for correcting errors from desired refractive indexes (step S28) and update the table data of the operation information memory section 23 by the corrected error data (step S29).

In the first embodiment, as set out above, the refractive index states are detected by the light emitting sections 41-1 and 41-2 and light receiving sections 42-1 and 42-2 at those areas of the electric deflection members 31-1 and 31-2 which are not conducive to the image formation and, by doing so, the correction control is carried out. Further, in accordance with a result of detection of this state, a voltage-refractive index table stored in the operation information storing section 23 is updated.

By doing so, the blurring correction apparatus can be provided which can stably maintain a blurring correction performance by a simpler method.

SECOND EMBODIMENT

An explanation will be made below about a second embodiment of the present embodiment.

In the second embodiment, only the blurring correction is made during an exposure and, after the completion of the exposure, the refractive index state is detected and the table is updated. Even by doing so, a blurring correction apparatus can be provided which can stably maintain a blurring correction performance by a simpler way.

Figures 7, 8:
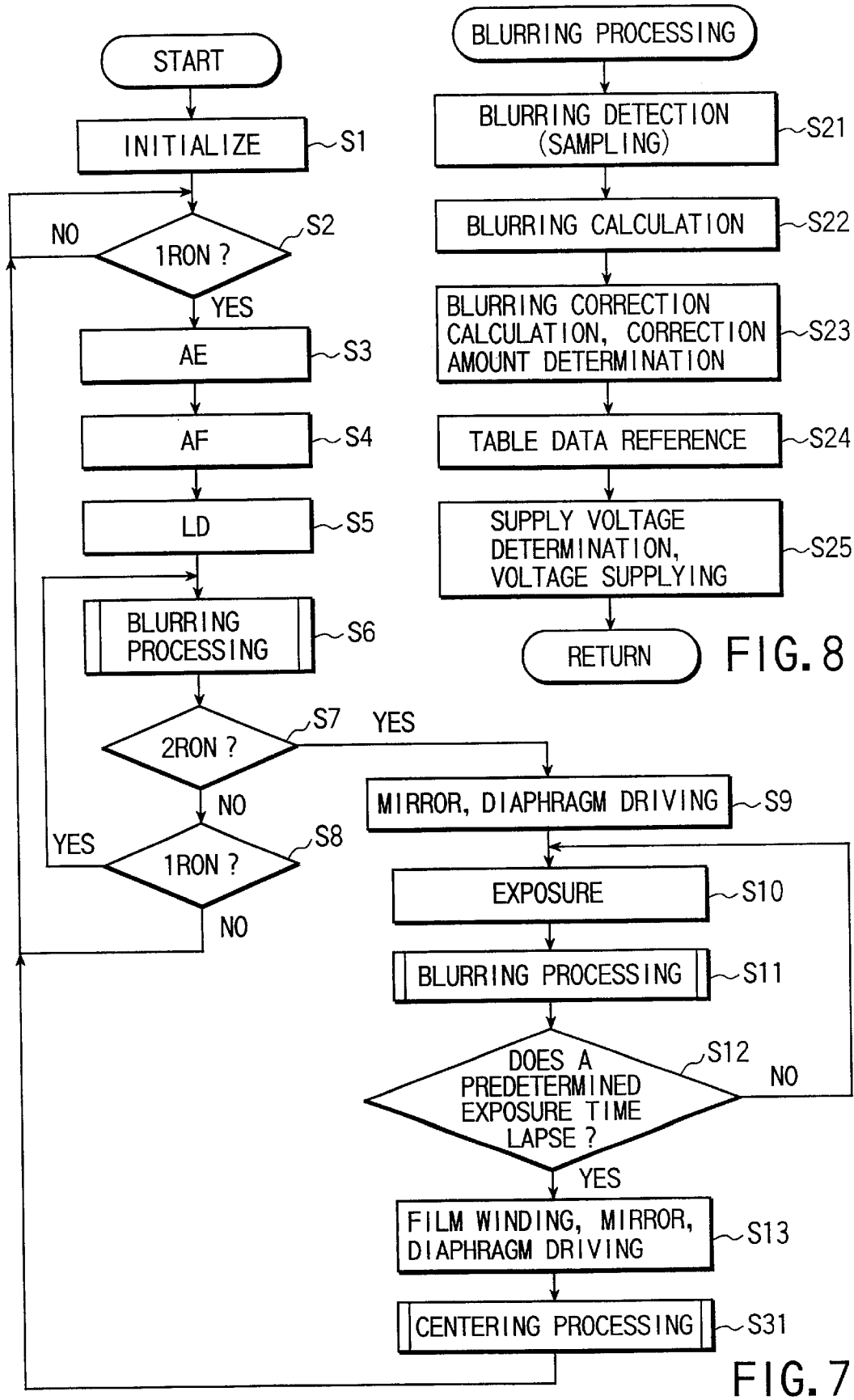
FIG. 7 is a flow chart for explaining the operation of an image taking apparatus applied to a blurring correction apparatus according to a second embodiment of the present invention.
FIG. 8 is an operation flow chart of the blurring processing in FIG. 7.

FIG. 7 is an operation flow chart of an image taking apparatus applied to a blurring correction apparatus according to this embodiment.

In this embodiment, subsequent to the above-mentioned step S13, centering processing (step S31) as will be set out below is carried out. In this connection it is to be noted that, in this case, blurring processing called at the above-mentioned steps S6 and S11 is also different from that of the first embodiment.

That is, in the blurring processing of this embodiment, as shown in FIG. 8, an image taking apparatus controlling section 6 is such that blurring detection is made at first and second blurring detecting sensors 11-1 and 11-2 in a blurring detecting/calculating section 1 (step S21) and blurring calculation is done at first and second blurring calculating sections 12-1 and 12-2 (step S22). And first and second direction determining sections 21-1 and 21-2 in a blurring correcting section 2 determine a correction direction relating to the first and second direction (step S23). Then, first and second correction controlling sections 22-1 and 22-2 in a blurring correction controlling section 2 refer to table data stored in an operation information storing section 23 (step S24), find voltage values corresponding to correction directions determined by the first and second direction determining sections 21-1 and 21-2 and cause voltages corresponding to these voltage values to be generated in the first and second voltage generating sections 51-1 and 51-2 to allow the voltages to be supplied to the first and second electric deflection members 31-1 and 31-2 (step S25). Subsequently, without performing such operations as steps S26 to S29, control goes back to an upper-order routine.

Centering processing called by the above-mentioned step S31 is adjusting processing for adjusting the supply voltages from first and second voltage generating sections 51-1 and 51-2 so that, without making blurring correction, light on an optical axis is correctly conducted toward the center of an image formation surface 91. Further, this centering processing also performs more accurately improved processing by updating the table data stored in the operation information storing section 23 from the outputs of light receiving sections 42-1 and 42-2 when first and second electric deflection members 31-1 and 31-2 are varied to one of their refractive index limits and the outputs of the light receiving section 42-1 and 42-2 when these electric deflection members are varied to the other refractive index limit. By doing so, it is possible to cope with an "aging" problem for example.

Figure 9:
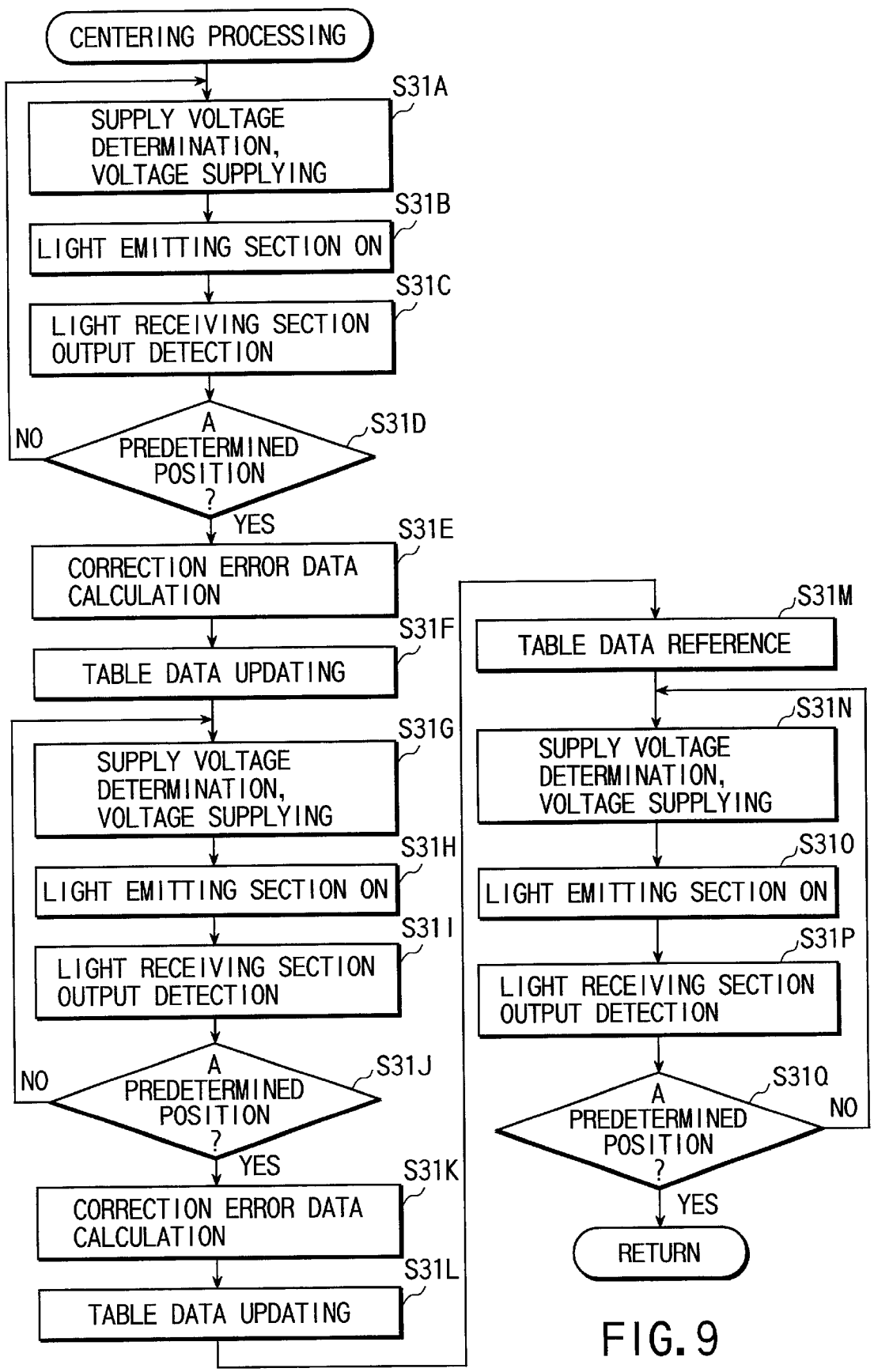
FIG. 9 is an operation flow chart showing centering processing in FIG. 7.

That is, in this centering processing, as indicated by a flow chart of FIG. 9, first a supply voltage for varying the first and second electric deflection members 31-1 and 31-2 to one of their refractive index limits is determined and this voltage is supplied by the first and second voltage generating section 51-1 and 51-2 (step S31A). And first and second light emitting sections 41-1 and 41-2 are turned ON (step S31B). The outputs of first and second light receiving sections 42-1 and 42-2 are detected (step S31C). Thereafter, it is decided, based on the detected outputs of the light receiving sections 42-1 and 42-2, whether or not the first and second electric deflection members 31-1 and 31-2 reach a predetermined position, that is, a refractive index state corresponding to the one refractive index limit (step S31D). If not yet, control goes back to step S31A and a new voltage is sought and supplied. When the above-mentioned predetermined position is reached, then correction error data is calculated from a voltage value at that time (step S31E). By its correction error data, the table data of the operation information storing section 23 is updated (step S31F).

If, in this way, correction is terminated on the one refractive index limit of the first and second electric deflection members 31-1 and 31-2, then a supply voltage for varying the first and second electric deflection members 31-1 and 31-2 to the other refractive index limit is determined and this voltage is supplied by the first and second voltage generating sections 51-1 and 51-2 (step S31G). And the first and second light emitting sections 41-1 and 41-2 are turned ON (step S31H) and the outputs of the first and second light receiving sections are detected (step S31I). Thereafter, it is decided, based on the detected outputs of the light receiving sections 42-1 and 42-2, whether or not the first and second electric deflection members 31-1 and 31-2 reach a predetermined position, that is, a refractive index state corresponding to the other refractive index limit (step S31J). If not yet, control goes back to step S31G and a new supply voltage is sought and supplied. If the above-mentioned position is reached, correction error data is calculated from the voltage value at that time (step S31K) and, by this correction error data, the table data of the operation information storing section 23 is updated (step S31L).

If, in this way, correction is terminated on the other refractive index limit of the first and second electric deflection members 31-1 and 31-2, finally in order to set the first and second electric deflection members 31-1 and 31-2 in a refractive index-free state, reference is made to the table data of the operation information storing section 23 (step S31M) to determine a supply voltage and its voltage is supplied by the first and second voltage generating sections 51-1 and 51-2 (step S31N). And the first and second light emitting sections 41-1 and 41-2 are turned ON (step S31O) and the outputs of the first and second light receiving sections 42-1 and 42-2 are detected (step S31P). Thereafter, it is decided, based on the detected outputs of the light receiving sections 42-1 and 42-2, whether or not the first and second electric deflection members 31-1 and 31-2 reach a predetermined position (step S31Q). If not yet, control goes back to step S31N and a new voltage is sought and supplied. And if the above-mentioned position is reached, the centering processing is terminated and control is returned back to an upper-order routine.

THIRD EMBODIMENT

An explanation will be made below about a third embodiment.

In an image taking apparatus having a blurring correction apparatus according to a third embodiment, when an image taking start designating section (2R) 72 of an operation device 7 is operated, a blurring correction controlling section 2 determines a correction direction from the "blurring" detected by the blurring detecting/calculating section 1 and, by a voltage generating section 5, the electric deflection member 3 is driven to correct the blurring. And when a refractive index state detecting section 4 detects an electric deflection member 3 as being set in its correction direction set out above, this is noticed from the blurring correction controlling section 2 to an image taking apparatus controlling section 6 and the image taking apparatus controlling section 6 allows an exposure device 8 to starts its exposing operation (image taking operation).

In this way, according to the third embodiment, the refractive index state (deflection state) of the electric deflection member 3 is determined/set from a blurring state prior to the starting of the exposure operation and, when the refractive index reaches a desired state, the starting of the exposure is done.

Figure 10:
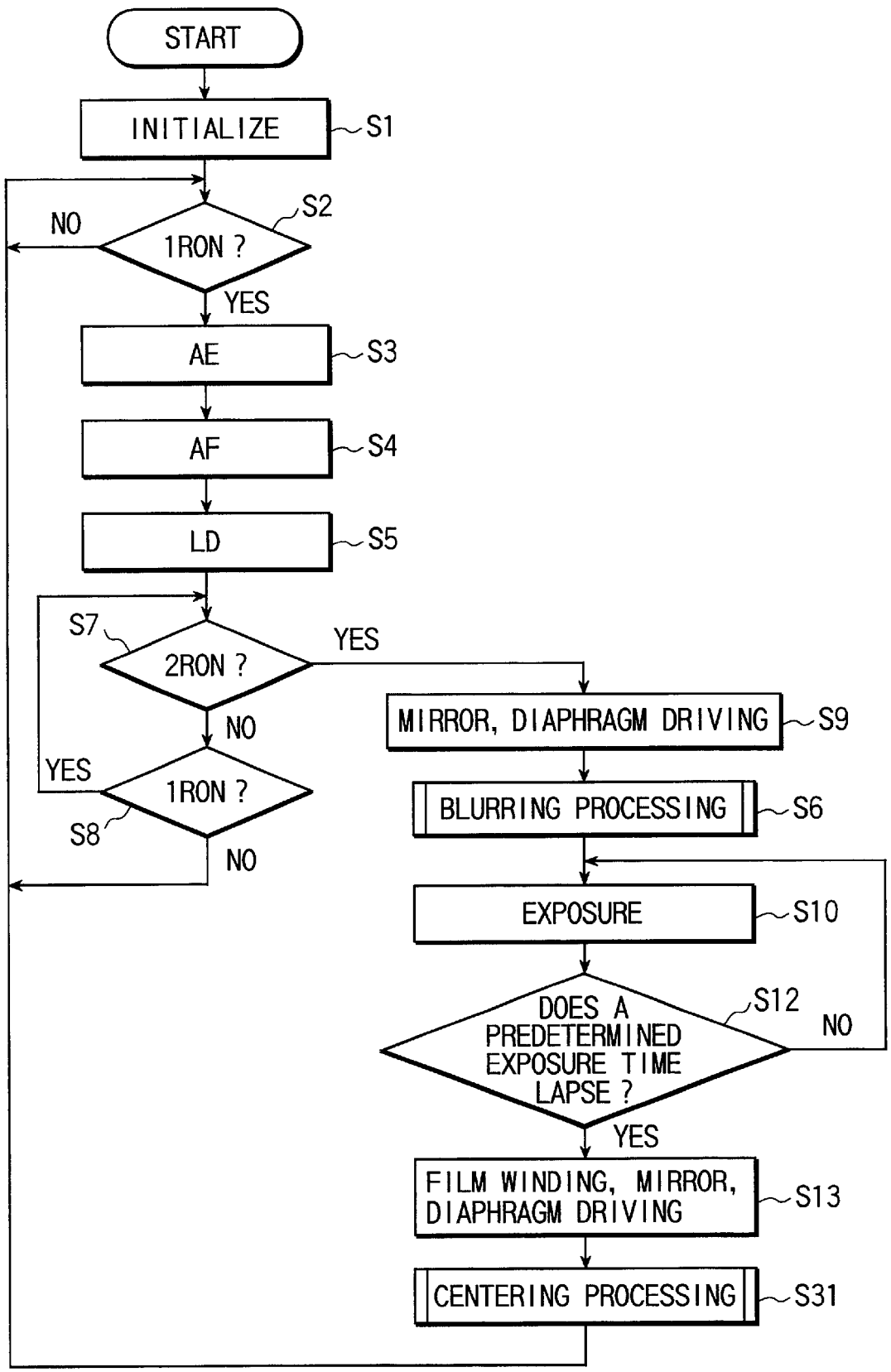
FIG. 10 is a flow chart for explaining the operation of an image taking apparatus applied to a blurring correction apparatus according to a third embodiment of the present invention.

FIG. 10 shows a flow chart of an operation of the image taking apparatus applied to the blurring correction apparatus according to this embodiment.

That is, after the operations of the above-mentioned steps S1 to S5, the image taking apparatus controlling section 6 decides whether or not the image taking start designating section (2R) 72 is turned ON without performing blurring processing as in the case of the above-mentioned first and second embodiments (step S7). If not, the operation state of the image taking preparation designating section (1R) 71 is decided at step S8 and, if still staying ON, control goes back to step S7, and, if no longer ON, control goes back to step S2.

If the image taking start designating section (2R) 72 is turned ON, the image taking apparatus controlling section 6 allows the driving of a mirror, diaphragm, etc., of the exposure device 8 to be started (step S9) and performs blurring processing (step S6). In this case, it is to be noted that the blurring processing called at step S6 is different from those of the first and second embodiments.

That is, the blurring processing of this embodiment is done as shown in FIG. 11. First, blurring detection is effected at first and second blurring detecting sensors 11-1 and 11-2 of the blurring detecting/calculating section 1 (step S21) and first and second blurring calculating sections 12-1 and 12-2 perform the "blurring" calculation (step S22). First and second direction determining sections 21-1 and 21-2 in the blurring correction controlling section 2 determine correction directions relating to the above-mentioned first and second directions (step S23). Thereafter, here, it is decided whether or not the driving of the mirror, diaphragm, etc., started at step S9 is terminated (step S41). If not yet, control goes back to step S21.

If the driving of the mirror, diaphragm, etc., is terminated, then first and second correction controlling sections 22-1 and 22-2 in a blurring correction controlling section 2 refer to table data stored in an operation information storing section 23 (step S24), find voltage values corresponding to the correction directions determined by the first and second direction determining sections 21-1 and 21-2 and cause voltages corresponding to these voltage values to be generated in first and second voltage generating sections 51-1 and 51-2 to allow the voltages to be supplied to first and second electric deflection members 31-1 and 31-2 (step S25).

Here, the first and second correction control sections 22-1 and 22-2 turn first and second light emitting sections 41-1 and 41-2 ON (step S26) and detect the outputs of first and second light receiving sections 42-1 and 42-2 (step S27). And it is decided, based on the outputs of the light receiving sections 42-1 and 42-2, whether or not first and second electric deflection members 31-1 and 31-2 reach a predetermined state, that is, a refractive index state corresponding to the above-mentioned correction direction (deflection direction) (step S42). Here, if not yet, control goes back to step S26 and, if the predetermined state is reached, the blurring processing is terminated and control is returned back to an upper-order routine.

That is, if, by the blurring processing, the first and second electric deflection members 31-1 and 31-2 reach the predetermined state, the first and second correction controlling sections 22-1 and 22-2 give signals representing this state to the image taking apparatus controlling section 6 and, in response to the signal, the image taking apparatus controlling section 6 starts an operation of the exposure apparatus 8 to effect an exposure operation (step S10). And it is decided whether or not a predetermined exposure time lapses (step S12). If not yet, control goes back to step S10.

If, in this way, a predetermined exposure time lapses, the mirror, diaphragm of the exposure device 8 are driven to an initial state (step S13). And the first and second correction controlling sections 22-1 and 22-2 cause centering processing of the first and second electric deflection members 31-1 and 31-2 to be performed (step S31) and control goes back to step S2.

FOURTH EMBODIMENT

An explanation will be made below about a fourth embodiment of the present invention.

Although, in the third embodiment, the exposure is started when the predetermined deflection state is reached by the blurring correction driving and no correction driving is not done during the exposure, the fourth embodiment is such that, when the exposure time is longer, correction driving is done also during its exposure. This exposure time is set to be, for example, about a 1/30 second. That is, if the exposure time is shorter than this value, a blurring locus during the exposure is shifted on a straight line in almost all cases, so that it may be possible to perform simpler blurring correction as in the third embodiment. In the case where the exposure time is longer than this, it may be possible that, during the exposure, the blurring direction varies. And it is preferable to perform blurring correction driving even during the exposure.

Figure 12:
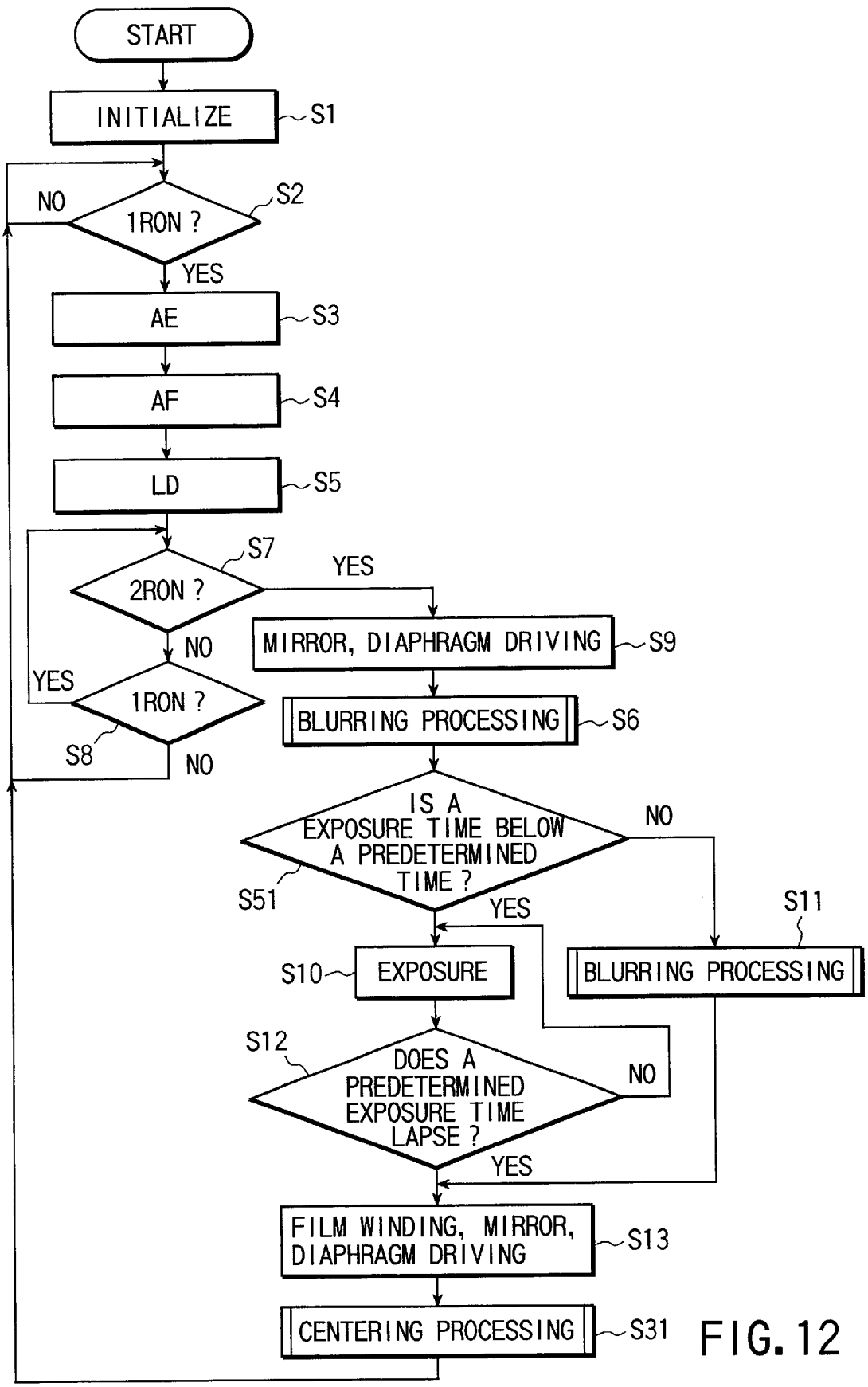
FIG. 12 is a flow chart for explaining the operation of an image taking apparatus applied to a blurring correction apparatus according to a fourth embodiment of the present invention.

FIG. 12 is a flow chart for explaining the operation of an image taking apparatus applied to a blurring correction apparatus according to a fourth embodiment of the present invention.

That is, in the fourth embodiment, when the first and second electric deflection members 31-1 and 31-2 become a predetermined state by the blurring processing of step S6 in the third embodiment, further the image taking apparatus controlling section 6 decides whether or not the exposure time is below a predetermined time (for example, 1/30 second) (step S51). And in the case where the light exposure time is below such a predetermined time, the processing at step S10, etc., as in the case of the third embodiment is done.

In the case where, it is decided that, at step S51 as set out above, the exposure time is longer than a predetermined time, blurring processing is carried out (step S11). The blurring processing called at step S11 is different from the blurring processing at step S6 and also different from the blurring processing at step S11 in the first and second embodiments above.

Figures 13, 15:
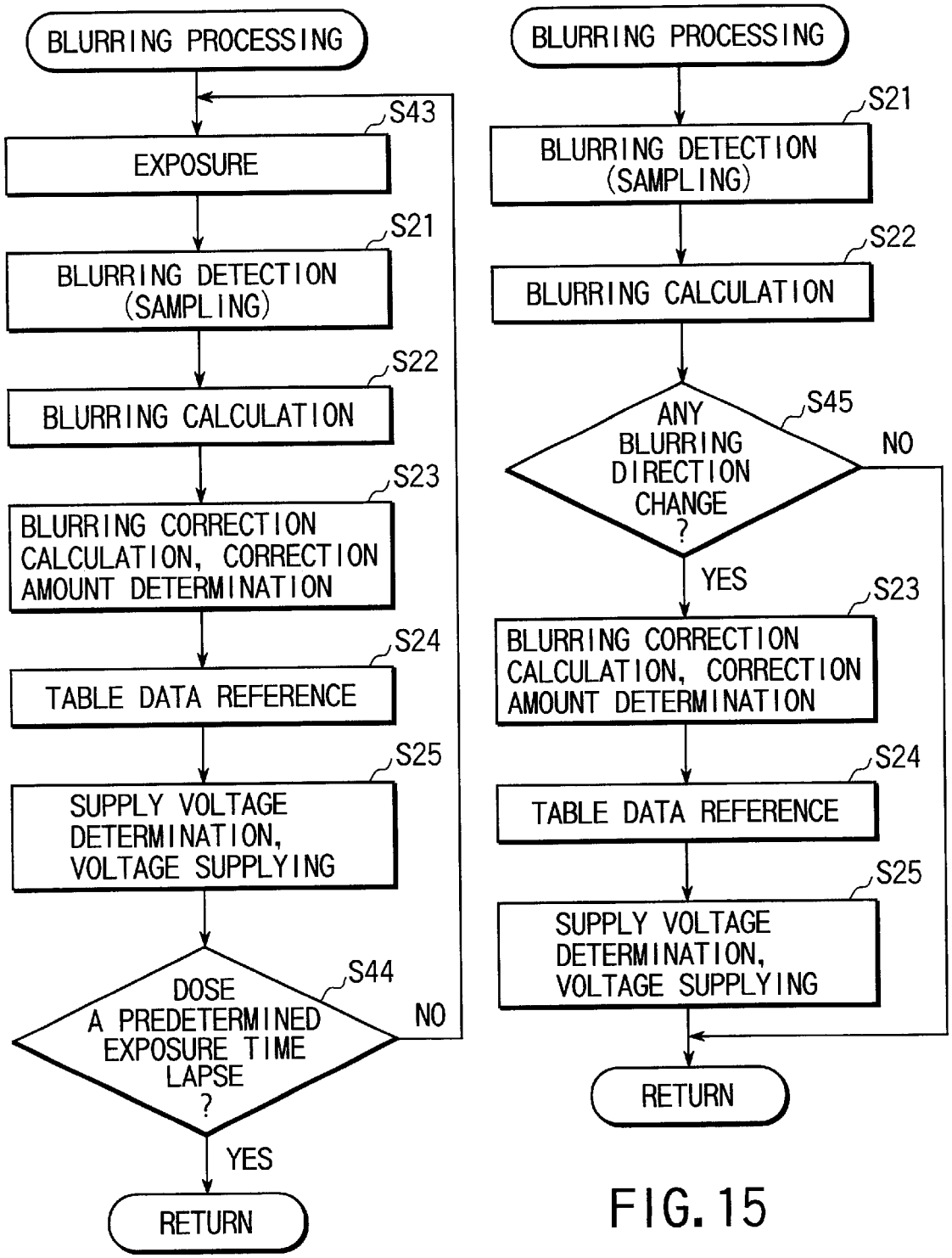
FIG. 13 is an operation flow chart of the blurring processing in FIG. 12.
FIG. 15 is an operation flow chart of the blurring processing in FIG. 14.

That is, as shown in FIG. 13, the image taking apparatus controlling section 6 starts an operation of the exposure device 8 and effects an exposure operation (step S43). Thereafter, here, first and second blurring detecting sensors 11-1 and 11-2 in the blurring detecting/calculating section 1 effect blurring detection (step S21) and first and second blurring calculating sections 12-1 and 12-2 perform "blurring" calculation (step S22). And first and second direction determining sections 21-1 and 21-2 in the blurring correction section 2 determine correction directions relating to the first and second directions (step S23). Then, first and second correction control sections 22-1 and 22-2 in the blurring correction controlling'section 2 refer to table data stored in an operation information storing section 23 (step S24), find voltage values corresponding to the correction directions determined by the first and second direction determining sections 21-1 and 21-2, and cause voltages corresponding to these voltage values to be generated in first and second voltage generating sections 51-1 and 51-2 to allow these voltages to be supplied to first and second electric deflection members 31-1 and 31-2 (step S25). Thereafter, it is decided whether or not the above-mentioned predetermined exposure time lapses (step S44). If not yet, control goes back to step S43. If the predetermined exposure time lapses, control is returned back to an upper-order routine.

FIFTH EMBODIMENT

An explanation will be made below about a fifth embodiment of the present invention.

Although, in the third embodiment, the exposure is started when the predetermined deflection state is reached by the blurring correction driving and, during this exposure, the correction driving is not done, the fifth embodiment is such that, in the case where the blurring direction varies during the exposure, the correction driving is resumed. Here, the "variation of the blurring direction" is intended to mean a variation of an up→down direction or down→up direction or of left→right direction and right→left direction.

Figure 14:
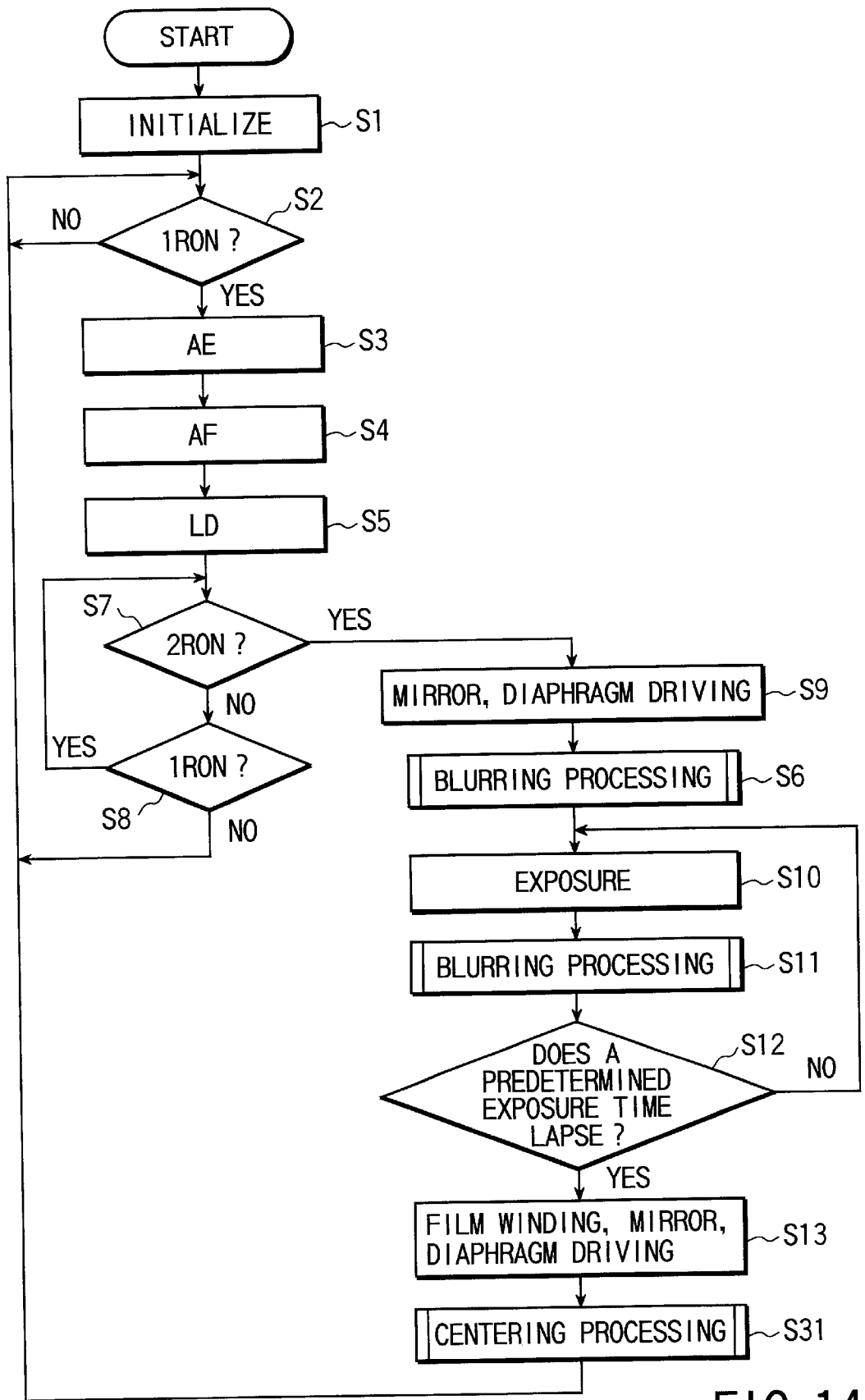
FIG. 14 is a flow chart for explaining the operation of an image taking apparatus applied to a blurring correction apparatus according to a fifth embodiment of the present invention.

FIG. 14 is flow chart for explaining the operation of an image taking apparatus applied to the blurring correction apparatus according to a fifth embodiment of the present invention.

When, by the blurring processing at step S6 in the above-mentioned third embodiment, first and second electric deflection members 31-1 and 31-2 become a predetermined state, an image taking apparatus controlling section 6 starts the operation of the exposure apparatus 8 and an exposure operation is done (step S10). Thereafter, according to this embodiment, blurring processing is carried out (step S11). The blurring processing called at step S11 is different from the blurring processing at step S6 and also different from the blurring processing at step S11 in the above-mentioned first, second and fourth embodiments.

That is, as shown in FIG. 15, first and second blurring detecting sensors 11-1 and 11-2 in the blurring detecting/calculating section 1 make "blurring" detection (step S21) and the first and second blurring calculation sections 12-1 and 12-2 perform blurring calculation (step S22). And as a result of the blurring calculation, it is decided whether or not the blurring direction varies (step S45). Here, in the case where no blurring direction varies, control goes to an upper-order routine's step S12.

At step S45, if it is decided that the blurring direction varies, then first and second direction determining sections 21-1 and 21-2 in the blurring correction controlling section 2 determine correction directions relating to the first and second directions (step S23). Then, first and second correction controlling sections 22-1 and 22-2 in the blurring correction controlling section 2 refer to table data stored in an operation information storing section 23 (step S24), find voltage values corresponding to the correction directions determined by the first and second direction determining sections 21-1 and 21-2, and cause voltages corresponding to these voltage values to be generated in the first and second voltage generating sections 51-1 and 51-2 to allow these voltages to be supplied to first and second electric deflection members 31-1 and 31-2 (step S25). Thereafter, control goes to an upper-order routine's step S12.

If, in this way, the blurring processing of step S11 set out above is terminated, it is decided, as in the third embodiment, whether or not a predetermined exposure time lapses (step S12). If not yet, control goes back to step S10. And if the predetermined exposure time lapses, the mirror and diaphragm of the exposure device 8 are driven to an initial state (step S13). Thereafter, the first and second correction controlling sections 22-1 and 22-2 perform centering processing (step S31) and control goes back to step 2 set out above.

Although the present invention has been explained based on the above-mentioned embodiments, the present invention is not restricted to the above-mentioned embodiments and can variously varied or applied within the spirit and scope of the present invention.

Although, in the above-mentioned embodiments, as the blurring correction members the electric deflection members 31-1 and 31-2 have been explained by way of example, the present invention can be also likewise applied to a blurring correction apparatus utilizing those blurring correction members using an ordinary actuator, such as a piezoelectric actuator, motor and magnet.

According to the present invention, as set out in more detail above, the blurring correction control is performed in a basically open state and it is not necessary to effect cumbersome control. And blurring correction control can be achieved with an operation processor not equipped with a higher function. In an inexpensive camera with a simply programmed exposure mode in particular, the present invention is proved effective because an image or picture is taken in a not-long time period.

Further, since the refractive index variation operation of the electric deflection members is stopped during the taking of an image or picture (during exposure), a blurring correction operation error resulting from an incomplete response is less likely to occur and it is possible to prevent any error shot of an image or picture.

Further, at a shot of a long time period or in the case of a blurring direction being inverted, etc., it is possible to make correction operation, as required, during an image shot (exposure) and hence to suppress dissipation power involved.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A blurring correction apparatus adapted to be mounted on an image taking apparatus, said blurring correction apparatus comprising:

blurring detecting means for detecting a blurring state of the image taking apparatus;

refractive index variable electric deflection means, arranged in an image taking optical system of the image taking apparatus, for correcting an adverse effect resulting from blurring of the image taking apparatus;

controlling means for controlling the electric deflection means in accordance with an output of said blurring detecting means; and refractive index state detecting means for detecting a refractive index state of said electric deflection means;

wherein said controlling means performs operation control of said electric deflection means based on a detection result of said refractive index state detecting means; and wherein said refractive index state detecting means includes:

means for emitting light to said electric deflection means;

means for receiving the light from said light emitting means through said electric deflection means; and detecting means for detecting the refractive index state of said electric deflection means in accordance with an output of said light receiving means.

2. An apparatus according to claim 1, wherein said means for emitting light emits light to an area of said electric deflection means which is not conducive to image formation.

3. An apparatus according to claim 1, wherein an emission operation of said means for emitting light and a light reception operation of said means for receiving light are performed at a time other than an image taking operation time of the image taking apparatus.

4. An apparatus according to claim 1, wherein said electric deflection means allows the refractive index state thereof to vary in accordance with a supply voltage, and said controlling means includes voltage generating means for supplying the supply voltage to said electric deflection means in accordance with the detection result of said refractive index state detecting means.

5. A blurring correction apparatus adapted to be mounted on an image taking apparatus, said blurring correction apparatus comprising:

blurring detecting means for detecting a blurring state of the image taking apparatus;

refractive index variable electric deflection means, arranged in an image taking optical system of the image taking apparatus, for correcting an adverse effect resulting from blurring of the image taking apparatus;

voltage generating means for generating a voltage for setting a refractive index of said electric deflection means;

refractive index state detecting means for detecting a refractive index state of said electric deflection means; and voltage controlling means for controlling a voltage generated by said voltage generating means based on outputs of said blurring detecting means and said refractive index state detecting means;

wherein said refractive index state detecting means includes:

means for emitting light to said electric deflection means;

means for receiving the light from said light emitting means through said electric deflection means; and detecting means for detecting the refractive index state of said electric deflection means in accordance with an output of said light receiving means.

6. An apparatus according to claim 5, wherein said voltage controlling means includes:

storing means for storing information corresponding to refractive index information of said electric deflection means and voltage information of said voltage generating means; and updating means for updating contents in said storing means in accordance with the output of said refractive index state detecting means.

7. An apparatus according to claim 6, wherein said storing means comprises an electrically readable and rewritable EEPROM.

8. A blurring correction apparatus adapted to be mounted on an image taking apparatus, said blurring correction apparatus comprising:

first and second electric deflection means, arranged in an image taking optical system of the image taking apparatus, for deflecting image taking light in first and second directions in accordance with a supply voltage, the deflection directions of said first and second electric deflection means being arranged orthogonal to an image taking optical axis on an image-taking image formation surface;

first and second blurring detection means for detecting blurring in first and second directions of the image taking apparatus;

blurring calculating means for calculating first and second blurring amounts in the first and second directions from outputs of said first and second blurring detection means;

determining means for determining deflection directions of said first and second electric deflection means based on the first and second blurring amounts calculated by said blurring calculating means;

voltage setting means for setting first and second voltage values to be supplied to said first and second electric deflection means in accordance with the deflection directions of said first and second electric deflection means determined by said determining means;

voltage generating means for supplying first and second supply voltages to said first and second electric deflection means in accordance with the first and second voltages set by said voltage setting means; and control means for controlling a blurring correction operation to be performed and to be terminated before an image taking operation by the image taking apparatus, and for controlling the deflection directions of said first and second electric deflection means not to vary during the image taking operation by the image taking apparatus.

9. An apparatus according to claim 8, wherein said first and second electric deflection means comprises a prism formed of an optical anisotropic medium whose refractive index varies in accordance with a supply voltage.

10. An apparatus according to claim 8, wherein said control means inhibits the blurring correction operation during the image taking operation when an exposure time of the image taking operation is below a predetermined time, but allows the blurring correction operation to be performed even during the image taking operation when the exposure time is not below the predetermined time.

11. An apparatus according to claim 8, wherein the control means controls the blurring correction operation to be resumed when the blurring direction varies during the image taking operation.

12. An apparatus according to claim 8, further comprising state detecting means for detecting deflection states of said first and second electric deflection means, and wherein said controlling means effects control in accordance with an output of said state detecting means.

13. An apparatus according to claim 8, wherein said voltage setting means comprises a nonvolatile memory storing a table showing a relation between deflection states of said first and second electric deflection means and the first and second supply voltages, and the first and second voltage values are set by referring to the table.

14. An apparatus according to claim 8, wherein said control means performs a centering operation for setting said first and second electric deflection means to a predetermined state after the termination of the image taking operation.

15. A blurring correction apparatus adapted to be mounted on an image taking apparatus, said blurring correction apparatus comprising:

first and second electric deflection members that are arranged in an image taking optical system of the image taking apparatus and that enable a refractive index to vary in accordance with a supply voltage, said first and second electric deflection members having deflection directions arranged orthogonal to an image taking optical axis on a shot image formation surface;

first and second blurring detection sensors that detect blurring in first and second directions of the image taking apparatus;

first and second blurring calculating sections that calculate first and second blurring amounts in the first and second directions from the outputs of said first and second blurring detection sensors;

first and second direction determining sections determine the deflection directions of said first and second electric deflection members based on the first and second blurring amounts calculated by said blurring calculating sections;

first and second correction controlling sections that set first and second voltage values to be supplied to said first and second electric deflection members in accordance with the deflection directions of said first and second deflection members output from said first and second direction determining sections;

first and second voltage generating sections that supply voltages corresponding to the first and second voltage values set by said first and second correction controlling sections; and a CPU for performing a blurring correction operation before an image taking operation by the image taking apparatus and inhibiting the blurring correction operation during the image taking operation by the image taking apparatus.

16. An image taking apparatus, comprising:

operation means for outputting a designation signal for designating performance of an image taking operation in accordance with a manual operation;

image taking means, having an image taking optical system, for performing an image taking operation;

image taking control means for controlling said image taking means in accordance with a designating signal outputted from said operation means and for causing the image taking operation to be performed;

detecting means for detecting a blurring state of the image taking apparatus;

blurring correction means arranged in the image taking optical system; and blurring correction controlling means for controlling said blurring correction means in accordance with an output of said detecting means to correct an adverse effect resulting from blurring of the image taking apparatus, wherein said blurring correction controlling means operates said blurring correction means in a predetermined direction in accordance with the designation signal output by said operation means, and stops operation of said blurring correction means during the image taking operation; and wherein said image taking controlling means controls the image taking operation to be performed after said blurring correction means reaches a predetermined state.

17. An apparatus according to claim 16, wherein said blurring correction controlling means enables the operation of said blurring correcting means during the image taking operation in accordance with an exposure time.

18. An apparatus according to claim 16, wherein, even during the image taking operation, said blurring correction controlling means controls the blurring correction operation to be resumed when a blurring direction detected by said detecting means varies.

* * * * *